United States Patent [19]

Russ et al.

[11] Patent Number: 5,389,235
[45] Date of Patent: Feb. 14, 1995

[54] CATALYTIC REACTION ZONE FOR SULFUR CONTAMINANT SENSITIVE CATALYST

[75] Inventors: Michael B. Russ, Villa Park; Thomas A. Jasonowicz, Hoffman Estates, both of Ill.

[73] Assignee: UOP, Des Plaines, Ill.

[21] Appl. No.: 984,652

[22] Filed: Dec. 2, 1992

[51] Int. Cl.$^6$ .............................................. C10G 35/04
[52] U.S. Cl. .................................................. 208/134
[58] Field of Search .................................... 208/134

[56] References Cited

U.S. PATENT DOCUMENTS

| | | | |
|---|---|---|---|
| 2,892,774 | 6/1959 | Porter et al. | 208/218 |
| 4,062,762 | 12/1977 | Howard et al. | 208/218 |
| 4,255,250 | 3/1981 | McCoy | 208/64 |
| 4,405,562 | 9/1983 | Zardi et al. | 422/148 |
| 4,789,462 | 12/1988 | Byrne et al. | 208/213 |
| 4,828,683 | 5/1989 | Gardner et al. | 208/243 |
| 5,035,792 | 7/1991 | Fousitzis et al. | 208/138 |

FOREIGN PATENT DOCUMENTS

| | | | |
|---|---|---|---|
| 4026925 | 7/1974 | Japan | 208/213 |
| 0125196 | 9/1980 | Japan | 208/217 |

Primary Examiner—David B. Springer
Attorney, Agent, or Firm—Thomas K. McBride; John G. Tolomei

[57] ABSTRACT

A combination downflow contaminant treatment and/or removal bed in combination with a radial flow bed of contaminant sensitive catalyst in a single reactor vessel eliminates unexpected deactivation of contaminant sensitive catalyst. The process of this invention also monitors the entrance of contaminants into the downflow contaminant treatment/removal bed to measure total contaminant loading to avoid unnecessary shut-downs of the reactor vessel during temporary contaminant loadings. This invention is particularly useful for highly sulfur sensitive reforming catalysts that are used in combination with a sulfur sorbent for removal of the sulfur contaminants.

7 Claims, 1 Drawing Sheet

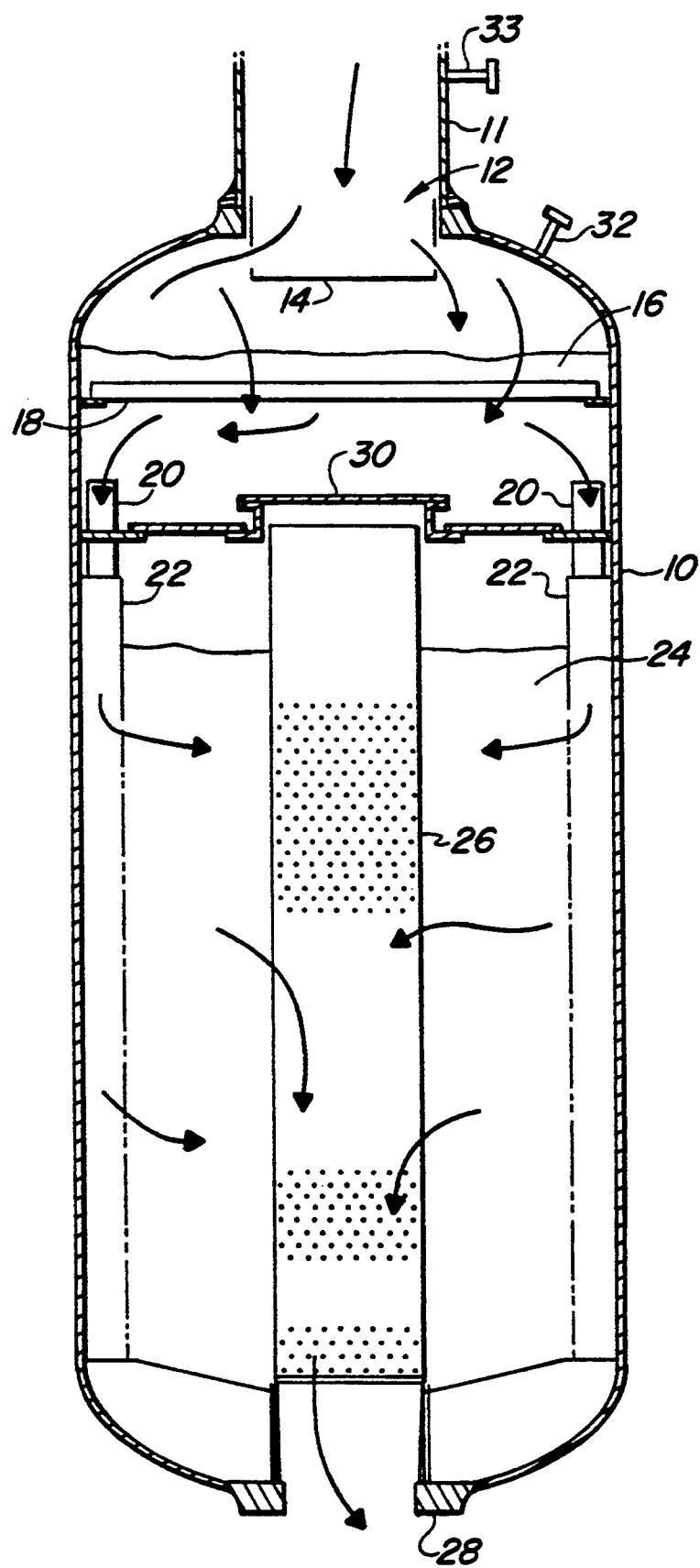

CATALYTIC REACTION ZONE FOR SULFUR CONTAMINANT SENSITIVE CATALYST

BACKGROUND OF THE INVENTION

This invention relates to a reaction zone for converting hydrocarbons with a contaminant sensitive catalyst.

FIELD OF THE INVENTION

In order to meet requirements for fuels and petrochemicals, processes routinely alter the structure of hydrocarbons using catalytic materials. Such hydrocarbon streams often contain impurities or contaminants that interfere with the performance of the catalytic material and the resulting conversion of the hydrocarbons. Such impurities include sulfur, nitrogen, oxygen and other trace metal compounds. Many catalysts are highly susceptible to the presence of such contaminants to the degree that small quantities in the range of a few parts per million or less can significantly detract from the performance of the catalyst. Guard beds and upstream treatment of feeds before contact with the catalyst can substantially prevent the deleterious effects of contaminants when present. Nevertheless, it is still found that occasionally contaminants will make their way to the catalytic material in spite of the presence of such guard beds or the use of upstream treatment. Such accidental contamination is expensive both in terms of the loss of catalyst and a loss of operating time for the adversely affected process as well as other processes that utilize the effluent from the adversely affected process. An example of one such process that operates with extreme contaminant sensitivity is catalytic reforming.

Catalytic reforming provides an important commercial process for the production of gasoline with high resistance engine knock and aromatic petrochemical intermediates from hydrocarbon feedstocks. The demand for aromatics production continues to grow rapidly throughout the world and the need for efficient catalytic reforming operations continue to grow. The feedstock for catalytic reforming generally comprises paraffinic and naphthenic hydrocarbons. Catalytic reforming restructures these hydrocarbons by dehydrogenating naphthenes to aromatics, dehydrocyclizing paraffins, isomerizing paraffins and naphthenes, dealkylating alkyl aromatics and hydrocracking paraffins to light hydrocarbons. The need for increased aromatics and gasoline production has focussed attention to the paraffin dehydrocyclization reaction which is less favored thermodynamically and kinetically in conventional reforming than other aromatization reactions. The use of a non-acidic L-zeolite catalyst having a platinum group metal is known to promote the dehydrocyclization reaction of paraffins over the competing hydrocracking reaction while minimizing the formation of coke byproducts. However, the extreme sensitivity of the L-zeolite catalyst to sulfur in the feed has interfered with the full utilization and commercialization of such catalyst.

It is an object of this invention to provide a process for converting hydrocarbons by contact with highly contaminant sensitive catalyst in a reactor arrangement that protects the catalyst from accidental exposure to such contaminants. Another object of this invention is to provide a process for the reforming of hydrocarbons using a non-acidic L-zeolite catalyst with a platinum group metal in a reactor arrangement that protects the catalyst from exposure to unexpected and unanticipated sources of sulfur contaminants.

SUMMARY OF THE INVENTION

This invention is based on the discovery that highly contaminant sensitive catalytic processes unexpectedly undergo deactivation from contact with contaminants that enter the process flow stream from unanticipated and sometimes unavoidable sources. The process arrangement of this invention avoids the unanticipated deactivation by combining a highly effective radial flow reactor bed arrangement for the contacting of a hydrocarbon feed with the contaminant sensitive catalyst immediately downstream of a relatively thin layer of contaminant treating material in a downflow bed positioned between the inlet to the reactor zone and the inlet to the radial flow bed. The unusual combination of a downflow bed with a radial flow bed in a single reactor vessel provides a buffer zone between the time that the presence of contaminants in the reactor can be detected and steps can be taken to eliminate the source of the contamination, or to cease process operation before expensive catalyst deactivation occurs. By avoiding deactivation of the catalyst, additional expenses and time for the replacement of contaminated catalyst is also avoided.

Accordingly, in one embodiment, this invention is a process for the catalytic conversion of a hydrocarbon feed using a contaminant sensitive catalyst and a conversion system that comprises a radial flow reactor vessel. The improvement comprises passing the hydrocarbon feed into the reactor vessel and through a downflow bed of contaminant treatment material at contaminant treatment conditions. The hydrocarbon feed passes from the bed of treatment material to a bed of contaminant sensitive catalyst having a radial flow arrangement and contacting the hydrocarbon feed with the contaminant sensitive catalyst at hydrocarbon conversion conditions.

In another embodiment, this invention is a process for the catalytic conversion of a hydrocarbon feedstock with a contaminant sensitive catalyst. The process passes a hydrocarbon feed to a reactor vessel and passes the feed through a contaminant sorbent material contained in the reactor vessel as a downflow bed. The feed passes from the downflow bed into contact with a contaminant sensitive catalyst arranged in the reactor vessel as a radial flow catalyst bed. Contaminants that enter the downflow bed are measured and measurements of the contaminant loading in the downflow bed are recorded and compared to the total contaminant sorbent capacity of the downflow bed.

In a yet further embodiment, this invention is a reactor apparatus for contacting a contaminant sensitive catalyst with a hydrocarbon feed. A reactor vessel defines a feed inlet and a feed outlet. A transverse support grid permeable to a flow of hydrocarbon feed supports a contaminant sorbent material below the feed inlet. Means are also provided for distributing the feed that contacts the support grid.

Other objects, embodiments and details of this invention are apparent from the following detailed description of the invention.

BRIEF DESCRIPTION OF THE DRAWING

FIG. is a sectional elevation of a reactor vessel arranged in accordance with this invention.

DETAILED DESCRIPTION OF THE INVENTION

The process of this invention finds application in any hydrocarbon conversion process that uses a contaminant sensitive catalyst. Such processes may include catalytic reforming, catalytic isomerization, hydrotreating or hydrocracking, hydrogenation or dehydrogenation, aromatics or olefin saturation, and oligomerization.

This invention can be applied to process arrangements that use single or multiple radial flow reactors. The radial flow reactors may be fixed bed reactors or have means for continuous catalyst addition and withdrawal to the radial flow and downflow reactor bed. Preferably, the downflow bed is maintained as a fixed bed of treatment material without provision for material addition or withdrawal during operation of the process. The arrangement of multiple reactors includes parallel and series flow arrangements with the downflow bed of this invention used in one or more reactors in such a system. This invention is particularly useful for systems that are used in conjunction with other contaminant removal steps or zones. This invention can simplify the operation of upstream contaminant removal zones that operate to remove the bulk of the contaminants by relying on the downflow bed in the reactor vessel to compensate for any short term upsets of contaminant removal. Thus, the safeguard capacity offered by the downflow bed allows upstream contaminant removal equipment to operate closer to full capacity thereby increasing efficiency and reducing cost.

The presence of the downflow bed directly in the reactor vessel containing the radial flow arrangement of contaminant sensitive catalyst eliminates the possibility of accidental contaminant entry causing immediate harm to the contaminant sensitive catalyst. Contaminants can enter from a wide variety of sources. As previously mentioned, upsets in upstream contaminant removal equipment can permit momentary breakthrough of contaminant material. In addition, recycle streams, such as hydrogen, may unexpectedly pick up contaminants in downstream separation equipment. Another source of contaminant entry is repair, servicing or replacement of processing equipment. For example, the use of old equipment such as heat exchange bundles or heaters are a common but often unrecognized source of sulfur contaminants. In addition, the treatment and servicing of piping and process equipment may leave residues of contaminant materials that slowly leach into the hydrocarbon stream downstream of dedicated contaminant removal processes. The presence of the downflow bed in the same reactor with the radial flow bed eliminates the possibility of introduction of contaminants from such unknown sources.

The process of this invention is also highly effective when used in conjunction with means for monitoring the presence of contaminant material immediately upstream of the contaminant treatment bed. Suitable monitoring devices would continually or intermittently sample the contents of the incoming process stream using an instrument capable of detecting small concentrations of the contaminant material, with means of recording or notifying the operator of contaminant content. The instrument can be located on the reactor vessel or in the immediately upstream piping of the inlet to a reactor arranged in accordance with this invention. When the detector reveals the presence of a contaminant, the downflow reactor bed provides time to investigate the source of the contaminant and provide the opportunity to eliminate contaminant introduction without interruption of the process.

FIG. 1 more fully reveals the reactor vessel arrangement of this invention. Referring then to FIG. 1, in the process of this invention a hydrocarbon feed enters a reactor vessel 10 through an inlet 12. A distributor 14 distributes the incoming hydrocarbon stream across the top of a bed 16 of contaminant treatment material supported by a grid 18. Distributor 14 provides means for equalizing the flow of hydrocarbons across the top of downflow bed 16 to prevent mal-distribution of the entering hydrocarbons and channelling of flow through limited portions of bed 16. Distributor 14, by equalizing the flow, also minimizes the possibility of the hydrocarbons disrupting the surface of bed 16 and thereby introducing mal-distribution. Where turbulence from the incoming hydrocarbon flow can affect the top surface of bed 16, a screen, perforated device, or other hold down material placed across the top of the bed will prevent bed surface disruption.

After treatment of contaminants in bed 16 by either sorptive removal or the conversion of contaminants to innocuous compounds, the hydrocarbon feed passes downwardly into inlet 20 of a distribution conduit 22 having a narrow width profile and perforations that permit the gas flow to travel radially across a bed 24 and into a perforated centerpipe 26. Centerpipe 26 collects converted hydrocarbons from bed 24 and discharges them from vessel 10 through an outlet 28. A cover plate section 30 above radial bed 24, secures the top of centerpipe conduit 26 and prevents hydrocarbon vapor from disrupting the top surface of bed 24. The total amount of contaminants sorbed in bed 16 is monitored by a sample tap 32 located on the top head of the vessel above bed 16 or optionally by a sample tap 323 on a process line 11.

In a preferred embodiment of this invention, contaminant monitoring occurs continuously immediately upstream of a downflow reactor bed containing a sorbent material for sorptive removal of the contaminant material from the process stream. Data from the continuous monitoring of contaminant presence provides input for calculating the total contaminant loading on the sorbent. By comparing the total sorbent contaminant loading with the contaminant capacity of the sorbent bed, it is possible to determine when the presence of contaminants require shut-down of a process operation to avoid damage to the contaminant sensitive catalyst. Such a monitoring system used in combination with the downflow bed provides complete assurance of contaminant sensitive catalyst protection while avoiding unnecessary process interruptions.

This invention typically uses only a small amount of contaminant treatment material in the downflow bed. Although greater amounts of contaminant treatment material can be contained in the downflow bed, a deep downflow bed will typically interfere with the operation of the process by increasing pressure drop through the reaction zone. In addition, a deep downflow bed is not practical when using this invention to retrofit the downflow bed into existing radial flow reactors. For ordinary operations, the thickness of the treatment bed will not exceed 12 inches. The addition of pressure drop is especially detrimental to reforming operations where low pressure operations are desirable. Therefore, the downflow bed will usually contain treatment material that produces a pressure drop of no more than 12 psi. However, maintaining uniform coverage of treatment material over the top of the bed usually requires a minimum bed thickness of about 3 inches.

In addition to pressure drop considerations, the thickness of the downflow treatment bed is also sized to provide a reasonable duration of contaminant removal. Thus, the bed is normally sized to provide contaminant removal for a continuous period of at least 24 hours. The sizing of the downflow bed for contaminant treatment is based on the presence of the contaminant in very low concentrations. For most operations, the contaminant concentration will be on the order of about 1 ppm or less.

Preferably, this invention will be applied in a catalytic reforming system using a non-acidic L-zeolite catalyst containing a Platinum Group metal that is highly sensitive to sulfur contamination. In the preferred catalytic reforming system, the feeds entering the reaction zones are typically sulfur-free. Sulfur-free refers to hydrocarbon feeds having low sulfur levels below 1 ppm and preferably below 100 to 50 ppb. The composition of the contaminant sensitive catalyst, in particular L-zeolite type catalysts, are described in detail in U.S. Pat. No. 5,035,792, the contents of which are hereby incorporated by reference.

In regard to reforming catalysts, the sulfur sensitivity of the conversion catalyst and the sulfur sensitive reforming catalyst can be measured as a sulfur sensitivity index or "SSI." The SSI is a measure of the effect of sulfur in a hydrocarbon feedstock to a catalytic reforming process on catalyst performance, especially on catalyst activity. The SSI is measured as the relative deactivation rate with and without sulfur in the feedstock for the processing of a hydrocarbon feedstock to achieve a defined conversion at defined operating conditions. Deactivation rate is expressed as the rate of operating temperature increase per unit of time (or, giving equivalent results, per unit of catalyst life) to maintain a given conversion; deactivation rate usually is measured from the time of initial operation when the unit reaches a steady state until the "end-of-run," when deactivation accelerates or operating temperature reaches an excessive level as known in the art. Conversion may be determined on the basis of product octane number, yield of a certain product, or, as here, feedstock disappearance. In the present application, deactivation rate at a typical feedstock sulfur content of 0.4 ppm (400 ppb) is compared to deactivation rate with a sulfur-free feedstock:

$SSI = D_s/D_o$ $D_s$ = deactivation rate with 0.4 ppm sulfur in feedstock $D_o$ = deactivation rate with sulfur-free feedstock "Sulfur-free" in this case means less than 50 ppb, and more usually less than 20 ppb, sulfur in the feedstock.

As a ratio, SSI would not be expected to show large variances with changes in operating conditions. The base operating conditions defining SSI in the present application are a pressure of about 4.5 atmospheres, liquid hourly space velocity (LHSV) of about 2, hydrogen to hydrocarbon molar ratio of about 3, and conversion of hexanes and heavier hydrocarbons in a raffinate from aromatics extraction as defined in the examples. Other conditions are related in the examples. Operating temperature is varied to achieve the defined conversion, with deactivation rate being determined by the rate of temperature increase to maintain conversion as defined above. A sulfur-sensitive catalyst has an SSI of over 1.2, and preferably at least about 2.0. Catalysts with an SSI of about three or more are particularly advantageously protected from sulfur deactivation according to the present invention.

It is essential that any sulfur sorbent used in this invention not only be effective for removal of small amounts of sulfur compounds from hydrocarbon streams at conversion-catalyst operating conditions, but also that the sorbent be compatible with the conversion catalyst in order to maintain the activity of the catalyst. The preferred sulfur sorbent comprises a metal oxide, preferably selected from oxides of the metals having an atomic number between 19 and 30 inclusive; these metals, particularly potassium, calcium, vanadium, manganese, nickel, copper and zinc are known to be effective for sulfur removal in various circumstances. The sorbent optimally comprises a manganese component. Manganese oxide has been found to provide reforming catalyst protection superior to the zinc oxide of the prior art, it is believed, due to possible zinc contamination of associated reforming catalyst. The manganese oxides include $MnO$, $Mn_3O_4$, $Mn_2O_3$, $MnO_2$, $MnO_3$, and $Mn_2O_7$. The preferred manganese oxide is $MnO$ (manganous oxide). It has been found that the magnesium oxide can adsorb 4 wt-% or more of sulfur compounds. The manganese component may be composited with a suitable binder such as clays, graphite, or inorganic oxides including one or more of alumina, silica, zirconia, magnesia, chromia or boria in order to provide a second particle for the physical mixture of the present catalyst system. Preferably, the manganese component is unbound and consists essentially of manganese oxide. Even more preferably the manganese component consists essentially of $MnO$, which has demonstrated excellent results for sulfur removal and has shown adequate particle strength without a binder for the second particle of the present invention.

Operating conditions used in a typical reforming process of the present invention include a pressure of from about atmospheric to 60 atmospheres (absolute), with the preferred range being from atmospheric to 20 atmospheres and a pressure of below 10 atmospheres being especially preferred. Free hydrogen preferably is supplied to the process in an amount sufficient to correspond to a ratio of from about 0.1 to 10 moles of hydrogen per mole of hydrocarbon feedstock. Operating temperature is from about 400°–560° C.

A typical hydrocarbon feedstock for reforming operations will comprise paraffins and naphthenes, and may comprise aromatics and small amounts of olefins, preferably boiling within the gasoline range. Feedstocks which may be utilized include straight-run naphthas, natural gasoline, synthetic naphthas, thermal gasoline, catalytically cracked gasoline, partially reformed naphthas or raffinates from extraction of aromatics. The distillation range may be that of a full-range naphtha, having an initial boiling point typically from 40°–80° C. and a final boiling point of from about 160°–210° C., or it may represent a narrower range within a lower final boiling point. Light paraffinic feedstocks, such as naphthas from Middle East crudes having a final boiling point of from about 100°–160° C., are preferred due to the specific ability of the process to dehydrocyclize paraffins to aromatics. Raffinates from aromatics extraction, containing principally low-value $C_6$–$C_8$ paraffins which can be converted to valuable B-T-X aromatics, are especially preferred feedstocks.

EXAMPLE

The process of this invention was used to process 192,500 lb-per/hr of a naphtha raffinate feed having an API gravity of 73 that passes through a series of 4 reactors. Before entering the first reactor, 76,800 lb-mol/hr of a recycle gas stream having the composition given in Table 1 mixes with the feed to provide 269,000 lb-mol/hr of a combined feedstream. The feedstream initially may contain sulfur in excess of 1 ppm, but passes through a series of sulfur traps to reduce sulfur to below 20 ppb. The final sulfur trap before the protected reactor removes sulfur from about 200 ppb to below 20 ppb. Failure of the last sulfur trap could result in 200 ppb sulfur entering the first protected reactor. In this example the protected reactor has a 7.5 foot diameter, with the feedstream entering the reaction zone at a temperature of about 500° to 540° C. Inside the protected reactor, the feed first contacts a manganese oxide sulfur sorbent in a downflow sorbent bed having a bed thickness of 4 inches. The sulfur sorbent is loaded on the top of the downflow bed to an apparent bulk density of about 100 lb/ft$^3$ and a 40% void fraction. Feed enters the reactor vessel at a pressure of about 6 atm. Passage of the feed across the downflow bed results in about a 4 psi drop in pressure. The feed then passes from the sulfur adsorbent bed to a radial flow bed located in the reaction vessel and containing an L-zeolite reforming catalyst comprising an L-zeolite and a platinum metal of the type described in the preceding discussion. Endothermic heat of reaction lowers the temperature so that another heater raises the temperature of the effluent from the reactor zone to about 500°-540° C. The heated effluent from the protected reactor passes through a series of additional radial flow reaction zones with interstage heating between the reaction zones.

At a breakthrough sulfur rate of 0.2 wt. ppm, Table 2 shows sulfur on the sorbent and the resultant life of the sorbent. Assuming a safe sulfur loading of as little as 1 wt-% on the sulfur sorbent, a 4 inch downflow bed of sulfur sorbent can provide over two weeks of protection from sulfur contamination after breakdown of other immediately upstream sulfur protection. Accordingly, it can be seen that a combination of a small downflow sorbent bed in a reactor vessel with a radial flow arrangement of sulfur contaminant sensitive catalyst will provide a simple and cost effective means of protecting the sulfur sensitive catalyst from deactivation.

TABLE 1

| COMPONENT | RECYCLE GAS LBMOL/HR |
|---|---|
| $H_2$ | 5906 |
| $C_1$ | 564 |
| $C_2$ | 94 |
| $C_3$ | 78 |
| $C_4$ | 62 |
| $C_5+$ | 560 |

TABLE 2

| SULFUR ON SORBENT as wt-% of fresh | SORBENT LIFE days |
|---|---|
| 1.0 | 15.9 |
| 2.0 | 31.8 |
| 4.0 | 63.6 |
| 8.0 | 127.2 |

We claim:

1. A process for the catalytic conversion of a hydrocarbon feedstock with an L-zeolite catalyst, said process comprising:
   a) passing a hydrocarbon feed to a reactor vessel;
   b) retaining a sorbent for the sorption of sulfur compounds in said reactor vessel as a downflow bed and passing said feed through said sorbent material;
   c) passing said feed from said downflow bed into contact with an L-zeolite catalyst arranged in said reactor vessel as a radial flow catalyst bed;
   d) measuring sulfur that enters said downflow bed;
   e) recording a measurement of sulfur loading in said downflow bed; and,
   f) comparing said measurement of sulfur loading to the total sulfur sorbent capacity of said downflow bed.

2. The process of claim 1 wherein the flow of said hydrocarbon feed through said bed is interrupted before said sulfur loading exceeds said sulfur compound capacity of said sorbent material.

3. The process of claim 1 wherein said downflow bed has a bed thickness of from 3 to 12 inches.

4. The process of claim 1 wherein said sorbent material comprises manganese oxide.

5. The process of claim 4 wherein said contaminant sensitive material comprises an L-zeolite reforming catalyst.

6. The process of claim 1 wherein said process includes passing said hydrocarbon feed through one or more stages of heating before said feed enters said reactor.

7. The process of claim 1 wherein said hydrocarbon feed passes through a sulfur removal zone before entering said reactor vessel.

* * * * *